W. NOBLE.
BOLT NUT.
APPLICATION FILED JULY 17, 1919.

1,381,587. Patented June 14, 1921.

Inventor
Warren Noble
by Wright Brown Quinby & Many
Attorneys

UNITED STATES PATENT OFFICE.

WARREN NOBLE, OF PROVIDENCE, RHODE ISLAND, ASSIGNOR TO N. C. L. ENGINEERING CORPORATION, OF PROVIDENCE, RHODE ISLAND, A CORPORATION OF NEW YORK.

BOLT-NUT.

1,381,587.  Specification of Letters Patent.  Patented June 14, 1921.

Application filed July 17, 1919. Serial No. 311,457.

*To all whom it may concern:*

Be it known that I, WARREN NOBLE, a subject of the King of Great Britain, residing at Providence, in the county of Providence and State of Rhode Island, have invented new and useful Improvements in Bolt-Nuts, of which the following is a specification.

This invention relates to a nut applicable to a bolt which projects from the exposed surface of a part in which the bolt is inserted, the nut being confined against accidental rotation on the bolt by a locking member such as a lock washer interposed between the nut and the said surface.

The invention is embodied in a casing engaged with the nut, and concealing not only the nut and the locking member, but also the end of the bolt, at the outer end face of the nut, said casing presenting a practically seamless external surface adapted to be polished, or otherwise ornamentally finished.

Of the accompanying drawings forming a part of this specification,—

The same reference characters indicate the same parts in all of the figures.

Figure 1:
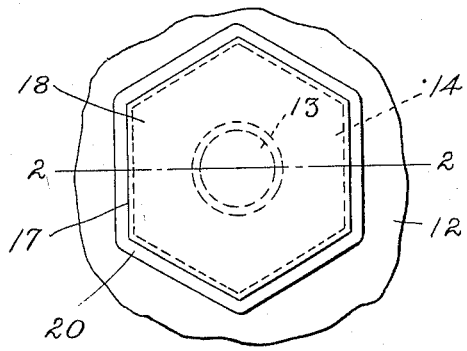
Figure 1 is a plan view showing by dotted lines a bolt and a nut engaged therewith, and by full lines a casing embodying the invention.
Figure 2:
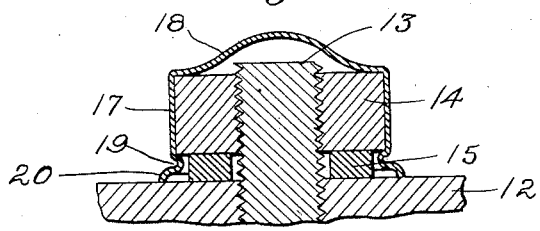
Fig. 2 is a section on line 2—2 of Fig. 1.
Figure 3:
Fig. 3 is an edge view of the lock washer shown in section by Fig. 2.
Figure 4:
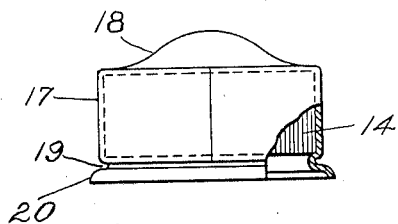
Fig. 4 is a side view of the casing, the same being partly broken away to show a portion of the nut.

In the drawings, 12 represents a body engaged by a threaded bolt 13, which projects from the exposed surface of said body. 14 represents an ordinary nut engaged with the bolt, and 15 represents a nut locking member, which may be an ordinary lock washer of the type shown by Fig. 3, interposed between the nut and the body 12.

The nut casing or cover of my invention is preferably seamless and formed from sheet material, preferably sheet metal, adapted to be shaped by a series of suitable operations well known to sheet metal workers, into substantially the form shown by the drawings.

The casing comprises a body portion 17, formed to cover the perimeter of the nut, and preferably conforming to the polygonal form of the nut, a head portion 18, formed to cover the outer end face of the nut and the outer end of the bolt, a contracted portion or zone 19 formed to engage the margin of the inner end face of the nut, and a base portion 20, formed to surround the locking member 15, and bear on the surface of the body 12.

The contracted portion 19, which may be formed by a suitable operation after the casing is applied to the nut, securely engages the casing with the nut. The base portion 20 preferably of tapering or flaring form, and is, therefore flexible and adapted to bear yieldingly on the body 12, so that it may cover either a relatively thin washer 15, or a washer of greater thickness.

The head portion 18 is preferably dome-shaped, and adapted to receive the portion of the bolt that protrudes from the nut.

The casing is preferably engaged with the nut before the latter is applied to the bolt, the polygonal body portion 17 constituting a wrench-engaging surface. The operation of applying the nut to a bolt to which a locking member 15 has been applied, therefore locates the casing in its operative position as a cover for the nut, the outer end of the bolt, and the locking member.

The casing may be ornamentally finished externally, in any suitable way.

If desired, the casing may be adapted to be forced to place on the nut after the latter is turned to its operative position on the bolt, the contracted portion 19 being adapted to yield, or be expanded sufficiently to pass over the perimeter of the nut, and then spring or snap into engagement with the margin of the inner end face of the nut.

Among the useful features or advantages resulting from the invention may be mentioned the following:

The nut body 14 may be made by any of the methods heretofore used in making ordinary nuts, and particularly by the efficient and least expensive of such methods. The methods heretofore used in making covered nuts, where the end covering is integral with the body of the nut, are expensive, but more particularly the nuts so made when enameled or plated are liable to receive a deposit of the enamel or plating metal in their threads, which necessitates either retapping before the nuts can be applied to the bolts for which they are designed, or the use originally of special taps designed to make the grooves deep and wide enough to allow for such enamel or plating deposit.

Since the covering or casing may be made from any sheet metal, whether the same metal as the nut body or not, it may be independently enameled or plated before being assembled with the body, and it may also be made by well known and inexpensive methods of drawing and forming or swaging, whereby the entire finished nut may be produced at much less expense. But the finished nut has all the valuable qualities of the old type of covered nut in regard to ornamental finish and protection of the bolt end, or of the bore or socket in the nut.

Whereas I have described the casing as provided with a base or skirt portion 20, in order to cover the washer, it is to be understood that such base portion may be omitted, if desired, and the casing brought to a termination, either flush with the under face of the nut body, or with its edges turned over the perimeter of said under face.

I claim:

1. A nut provided with a casing of sheet material including a body portion covering the perimeter of the nut, a head portion covering the outer end face of the nut, a contracted portion engaging the margin of the inner end face of the nut, and a base portion formed to surround a locking member.

2. A nut provided with a casing of sheet material including a body portion covering the perimeter of the nut, a head portion covering the outer end face of the nut, a contracted portion engaging the margin of the inner end face of the nut, and a base portion formed to surround a locking member, said base being flexible and conformable to the thickness of the locking member.

3. A nut having an attached casing of sheet material including a body portion covering the perimeter of the nut, a head portion covering the outer end face of the nut, and a turned in shoulder interlocked with the margin of the opposite end face of the nut.

4. A nut casing formed from sheet material and comprising a body portion formed to cover the perimeter of a nut, a head portion formed to cover the outer end face of the nut, a contracted portion adapted to engage the margin of the inner end face of the nut, and a base portion formed to surround a locking member.

5. A nut casing formed from sheet material and comprising a body portion formed to cover the perimeter of a nut, a head portion formed to cover the outer end face of the nut, and an inturned shoulder adapted to engage the margin of the inner end face of the nut.

6. A nut casing formed from sheet material and comprising a body portion formed to cover the perimeter of a nut, a head portion formed to cover the outer end face of the nut, a contracted portion adapted to engage the margin of the inner end face of the nut, and a base portion formed to surround a locking member, said base portion being flexible and conformable to the thickness of the locking member.

7. A covered nut comprising the combination with a nut body having a threaded bore passing entirely through it, of a covering of sheet metal fitting the sides of the nut body, and extending continuously across one end face of the body and the bore opening therein, and being bent inward to engage the margin of the opposite face of said body.

In testimony whereof I have affixed my signature.

WARREN NOBLE.